(12) United States Patent
Melpolder et al.

(10) Patent No.: US 6,497,182 B2
(45) Date of Patent: Dec. 24, 2002

(54) RAILROAD LOCOMOTIVE TRACTION MOTOR ISOLATION

(75) Inventors: Donald J. Melpolder, Erie, PA (US); Michael S. Lupichuk, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/775,901

(22) Filed: Feb. 2, 2001

(65) Prior Publication Data

US 2001/0042490 A1 Nov. 22, 2001

Related U.S. Application Data

(60) Provisional application No. 60/179,869, filed on Feb. 2, 2000.

(51) Int. Cl.$^7$ .............................................. B61C 11/00
(52) U.S. Cl. .............................. 105/73; 105/49; 318/63; 318/362; 318/439
(58) Field of Search ................................ 105/49, 96, 30, 105/73, 76, 85; 388/806, 815, 821–823, 828, 833; 318/63, 254, 261, 362, 375, 380, 439

(56) References Cited

U.S. PATENT DOCUMENTS

| | | | | |
|---|---|---|---|---|
| 5,392,716 A | * | 2/1995 | Orschek et al. ................ | 105/49 |
| 5,517,093 A | * | 5/1996 | Augustyniak et al. ......... | 318/375 |
| 5,530,328 A | * | 6/1996 | Fernandez et al. ............ | 246/187 C |
| 5,757,154 A | * | 5/1998 | Peot ............................ | 318/113 |

* cited by examiner

*Primary Examiner*—Pam Rodriguez
(74) *Attorney, Agent, or Firm*—Keith J. Murphy; Carl A. Rowold

(57) ABSTRACT

A railroad locomotive includes traction motors for propelling the locomotive, and an isolation switch disposed in signal communication with at least one of the traction motors for isolating a faulting motor from the other traction motors.

19 Claims, 4 Drawing Sheets

RAILROAD LOCOMOTIVE TRACTION MOTOR ISOLATION

CROSS-REFERENCE TO RELATED APPLICATIONS

This application claims the benefit of United States provisional application No. 60/179,869, filed Feb. 2, 2000, the contents of which are incorporated by reference herein in their entirety.

BACKGROUND

Locomotives may employ a plurality of traction motors, typically four or six, for driving locomotive wheels. However, conventional wiring of these motors has led to certain disadvantages with respect to the interrelationships between respective motors. For example, prior art traction motors were typically hard wired in parallel and/or series with at least three to five other motors. Thus, a fault in one motor would render all of the motors inoperable and thereby render the locomotive inoperable. Accordingly, it is desirable to provide traction motor isolation for railroad locomotives to disable any individual traction motors exhibiting faults while leaving the non-faulting motors operable.

SUMMARY

The aforementioned and other drawbacks and deficiencies of the prior art are overcome or alleviated by a traction motor isolation switch in accordance with the present disclosure.

A railroad locomotive includes traction motors for propelling the locomotive, and an isolation switch disposed in signal communication with at least one of the traction motors for isolating a faulting motor from the other traction motors.

These and other features and advantages of the present disclosure may be better understood and appreciated when considered in conjunction with the following detailed description and associated drawings.

BRIEF DESCRIPTION OF THE DRAWINGS

Referring now to the drawings, in which like elements are numbered alike in the several Figures.

DESCRIPTION OF PREFERRED EMBODIMENTS

Figure 1:
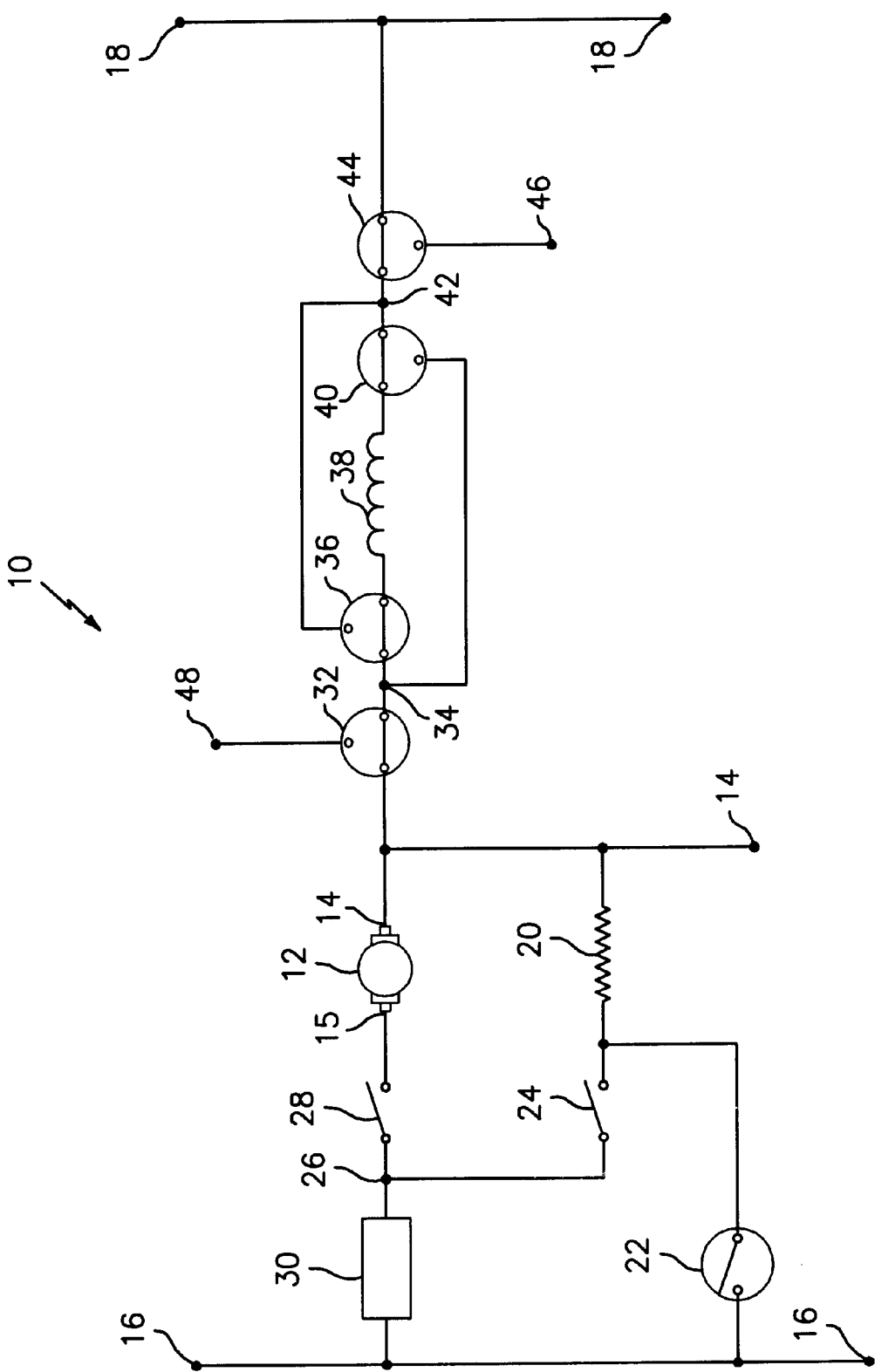
FIG. 1 is a diagram of a prior art traction motor circuit.

FIG. 1 shows a prior art traction motor circuit generally indicated by the reference numeral 10. The circuit 10 is part of a larger circuit (not shown) having at least two circuits 10 electrically connected in parallel between positive power leads 16 and negative power leads 18. Each circuit 10 supports a traction motor 12. Each traction motor 12 has a negative motor lead 14 that is tied to the negative lead of the counterpart traction motors 12 in the larger circuit (not shown), and a positive motor lead 15.

A brake grid resistor 20 is connected at a first end to the negative motor lead 14, and at a second end to a braking switch 22 and a self-load box contactor switch 24. A contactor switch is a switch that can open under an electrical load, and typically has blowout coils. The braking switch 22 is connected, in turn, to the positive power lead 16; and the self-load box contactor switch 24 is connected, in turn, to ajunction 26. The junction 26 is connected to a contactor switch 28, which is connected, in turn, to the positive motor lead 15. The junction 26 is also connected to a shunt 30, which is connected to the positive power lead 16.

The negative motor lead 14 is also connected to a braking switch 32, which has its through terminal connected to ajunction 34. The junction 34 is connected to a reversing switch 36, which has its through terminal connected to a field inductance 38. The field inductance 38 is connected, in turn, to a reversing switch 40. The third terminal of the reversing switch 40 is connected to the junction 34, and the through terminal of the reversing switch 40 is connected to a junction 42. The junction 42 is connected to the third terminal of the reversing switch 36. The junction 42 is also connected to a braking switch 44, which has its through terminal connected to the negative power lead 18.

The third terminal 46 of the braking switch 44 is connected to the field of the next traction motor at the terminal corresponding to reference numeral 48, while a third terminal 48 of the braking switch 32 is connected to the previous traction motor field, such as from the terminal 46 of the next traction motor field of the previous traction motor. In other words, each terminal 46 is connected to a terminal 48 of another circuit 10 that corresponds to another or next traction motor, and each terminal 48 is connected to a terminal 46 of another circuit 10 that corresponds to another or previous traction motor.

Figure 2:
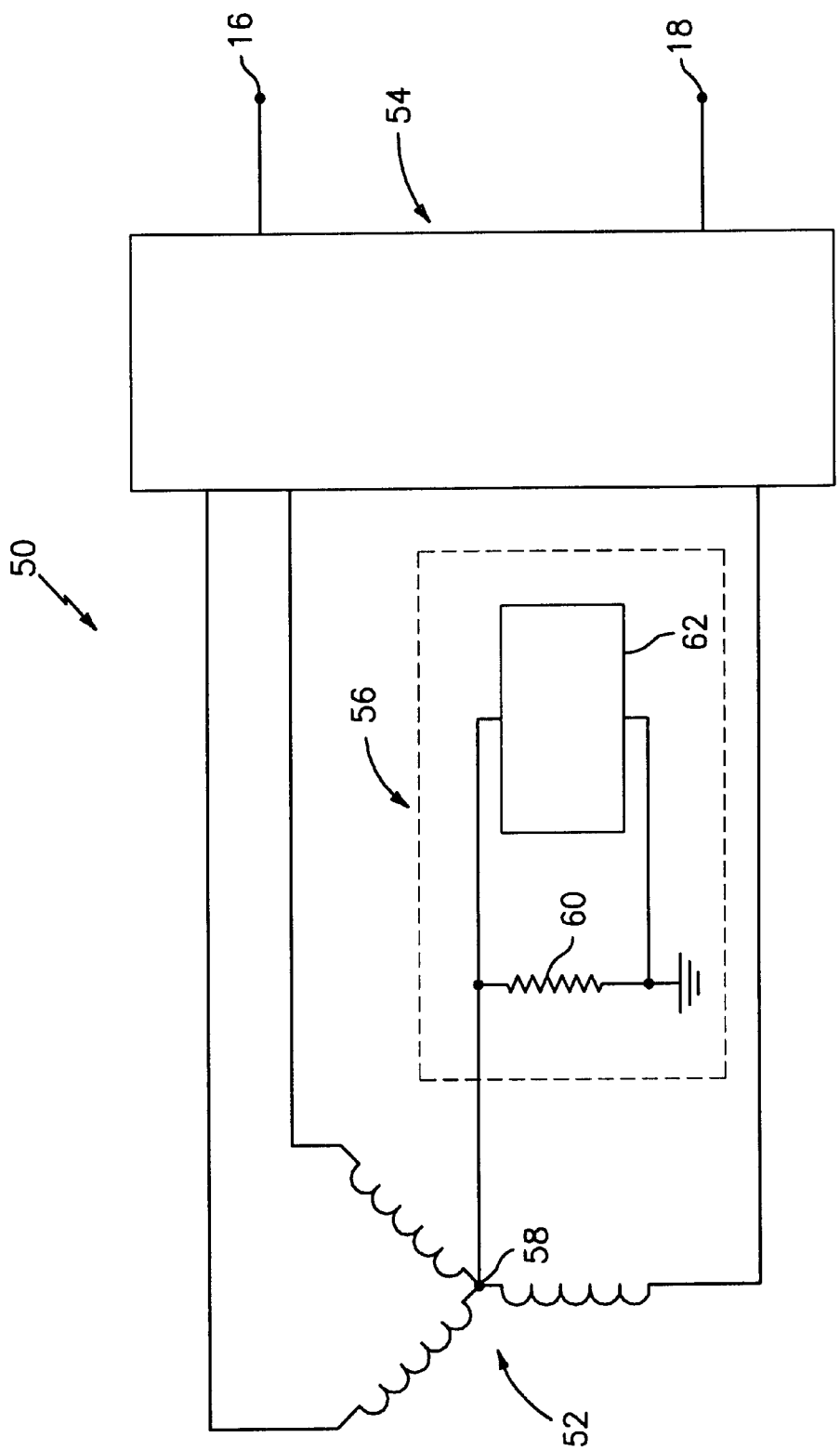
FIG. 2 is a diagram of an alternator and ground-fault detection circuit.

In FIG. 2, a supply circuit is indicated generally by the reference numeral 50. The circuit 50 has a positive power lead 16 connected to the positive power lead 16 of FIG. 1, and a negative power lead 18 connected to the negative power lead 18 of FIG. 1. The supply circuit 50 includes an alternator 52 for producing electricity, connected to a regulator 54. The regulator 54 typically includes diode rectifiers and voltage regulation circuitry as known in the pertinent art. The regulator 54 is connected, in turn, to the positive and negative power leads 16 and 18, respectively.

The exemplary supply circuit 50 further includes fault detection circuitry 56. The circuitry 56 detects a ground-fault condition developing on either the positive power lead 16 or the negative power lead 18 by providing a path for the fault current from a neutral terminal 58 of the alternator 52 through a resistor 60 to ground potential. Detection circuit 62 generally senses the voltage drop across the resistor 60 as indicative of the current flow across the resistor 60 due to a ground-fault.

Thus, the circuit 50 will detect fault current by monitoring the current in the neutral leg 58 of the alternator 52. Typically, the sensed fault current will be used to disable traction motors of the locomotive as connected in a parallel circuit. A ground-fault condition developing on either the positive side 16 or the negative side 18 of the propulsion voltage will provide a path for the fault current through the resistor 60 to the neutral leg 58 of the alternator 52. The ground-fault detector 62 will sense the fault current across the resistor 60.

There are a number of possible ground-faults. For example, a traction motor ground-fault may develop with a wet traction motor series field, armature or brushes. Alternate faults may originate in the traction motor leads or in the grid resistors.

Figure 3:
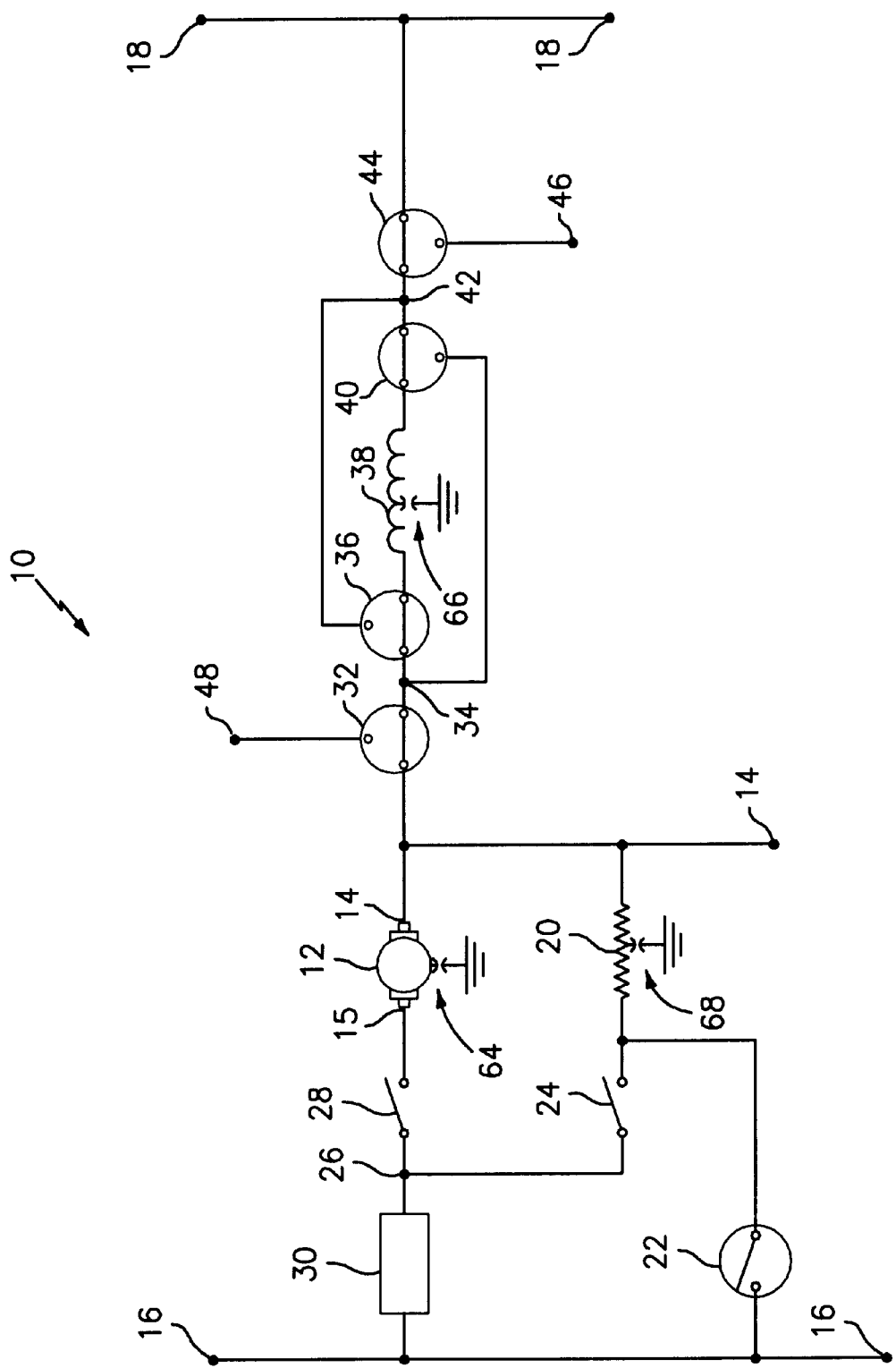
FIG. 3 is a diagram of the prior art traction motor circuit but showing faults exposing the circuit to ground in several locations.

FIG. 3 shows the traction motor circuit 1 of FIG. 1, with three plausible ground-fault conditions. As shown in FIG. 3, a ground-faulting armature is indicated generally by the reference numeral 64, a ground-faulting field is indicated generally by the reference numeral 66, and a ground-faulting grid resistor is indicated generally by the reference numeral 68. Any one of these ground-faults 64, 66, or 68 will provide a path between the alternator neutral 58 of FIG. 2 and the propulsion voltage leads 16 and 18.

Figure 4:
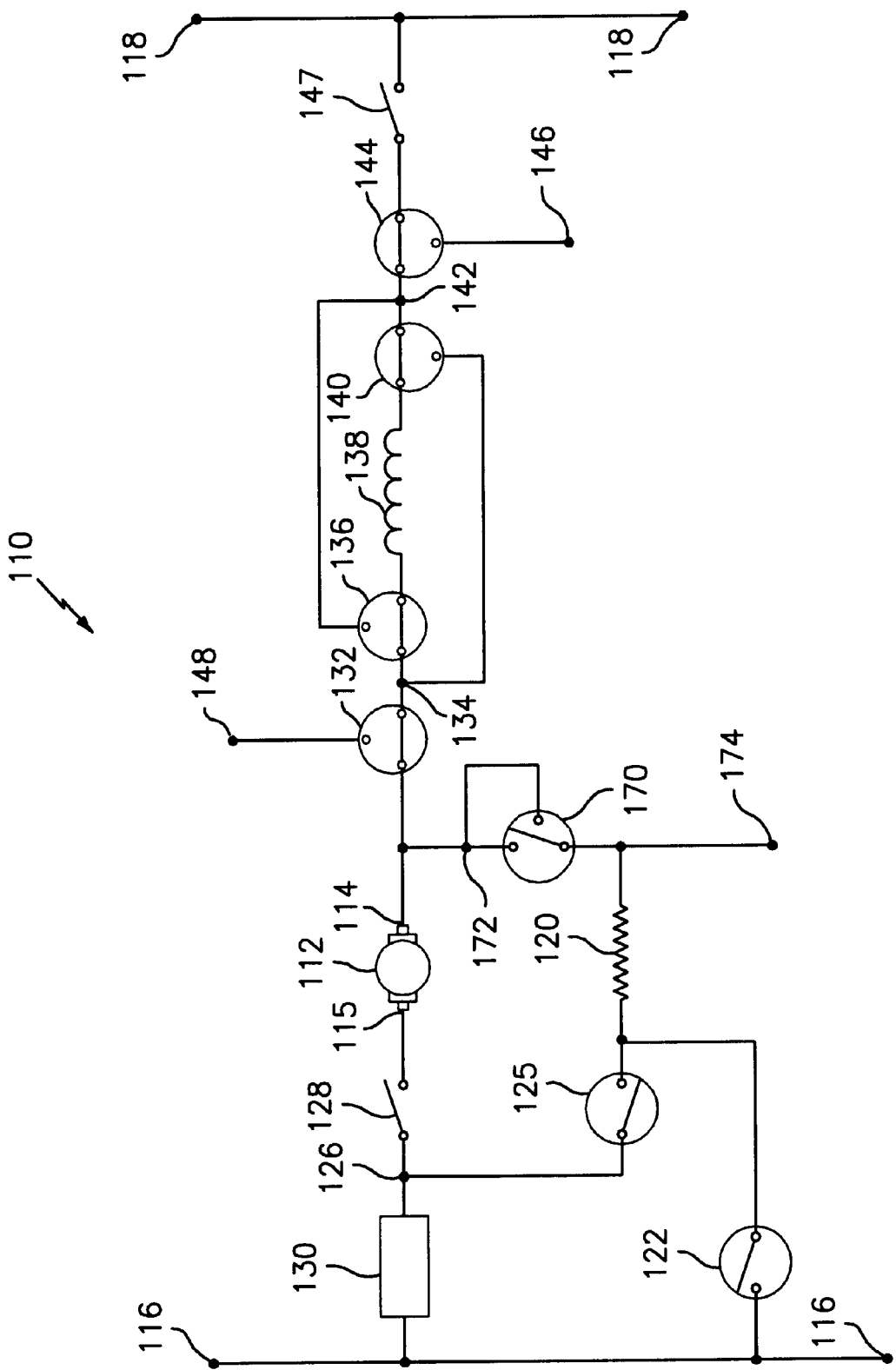
FIG. 4 is a diagram of a traction motor circuit of this invention with traction motor circuit isolation.

Turning now to FIG. 4 wherein like reference numerals preceded by the number 1 are used to refer to like elements, an exemplary improved traction motor circuit is indicated generally by the reference numeral 110. The circuit 110 is part of a larger circuit (not shown) having at least two circuits 110 electrically connected in parallel between positive power leads 116 and negative power leads 118. Each circuit 110 supports a traction motor 112. Each traction motor 112 has a negative motor lead 114 that is connected to a junction 172, and a positive motor lead 115.

A brake motor isolation switch 170 is connected at each of its switched terminals to the junction 172, and at its through terminal to a switched negative lead 174. The switched negative lead 174 is tied to the switched negative leads 174 of the counterpart circuits 110 in the larger circuit (not shown). The switched negative lead 174 is also connected to a first end of a brake grid resistor 120. The grid resistor 120 is connected at its second end to a braking switch 122 and a brake motor isolation switch 125.

The braking switch 122 is connected, in turn, to the positive power lead 116; and the brake motor isolation switch 125 is connected, in turn, to a junction 126. The junction 126 is connected to a contactor switch 128, which is connected, in turn, to the positive motor lead 115. The junction 126 is also connected to a shunt 130, which is connected to the positive power lead 116.

The negative motor lead 114 is also connected to a braking switch 132, which has its through terminal connected to a junction 134. The junction 134 is connected to a reversing switch 136, which has its through terminal connected to a field inductance 138. The field inductance 138 is connected, in turn, to a reversing switch 140.

The third terminal of the reversing switch 140 is connected to the junction 134, and the through terminal of the reversing switch 140 is connected to a junction 142. The junction 142 is connected to the third terminal of the reversing switch 136. The junction 142 is also connected to a braking switch 144, which has its through terminal connected to a new contactor switch 147. The switch 147 is connected, in turn, to the negative power lead 118.

The third terminal 146 of the braking switch 144 is connected to the field of the next traction motor at the terminal corresponding to reference numeral 148, while a third terminal 148 of the braking switch 132 is connected to the previous traction motor field, such as from the terminal 146 of the next traction motor field of the previous traction motor. In other words, each terminal 146 is connected to a terminal 148 of another circuit 110 that corresponds to another or next traction motor, and each terminal 148 is connected to a terminal 146 of another circuit 110 that corresponds to another or previous traction motor.

In operation of the circuit 110, the brake motor isolation switch 170 switches off between a negative motor lead 114 of a traction motor 112 and a brake grid resistor 120, to electrically separate the resistor 120 from the traction motor 112. The resistor 120 is not required during a normal motoring mode when no braking is required, so a faulting resistor 120 is isolated with the brake motor isolation switch 170. Under normal non-fault conditions, the brake motor isolation switch 170 connects the resistors 120 for dynamic braking and self-load functions. However, during a ground-fault of a resistor 120, the brake motor isolation switch 170 disables the dynamic braking and self-load function to isolate the fault.

Similarly, if a ground-fault current develops in a traction motor 112, a controller (not shown) will be able to isolate the motor 112 by locking out the faulting motor 112. The controller (not shown) will open a motor contactor 128 on a positive motor lead 115 and open the brake motor isolation switch 170 on the negative motor lead 114. By opening the positive and negative leads, 115 and 114 respectively, the faulting traction motor 112 will be isolated, and the locomotive will again be operational.

The present embodiment provides the operator or controller with the ability to isolate a grounded traction motor to allow the locomotive to complete its mission, and return to the service shop under its own power. Using this feature, the locomotive will not be disabled with a ground-fault on either a traction motor or a grid resistor. The electrical isolation of the grid resistors allows motoring of the traction motors during a faulting condition. However, the faulting condition will result in some loss of dynamic braking and self-load. One or more grounded traction motor circuits may be detected and reported by appropriate software to limit operation of the locomotive, if necessary. The traction motor isolation may be automatic or may require the operator to manually switch out the faulting motor by trial and error. Isolation of a faulting motor in a trailing locomotive may also be automatic or require the operator to manually switch out the faulting motor.

In one operating mode, onboard diagnostics may detect fault current from a grounded traction motor and temporarily disable the locomotive. The operator would then be able to isolate the faulting motor by opening the motor contactor switch on the positive propulsion lead and opening a new contactor switch on the negative propulsion lead. By isolating the faulting traction motor, the locomotive will again be operational but with de-rated performance.

Traction motor isolation may also include isolation of grid resistors. With prior locomotive wiring, the grid resistors were typically wired to the negative motor lead of the even numbered traction motors, and the common wiring of the resistors to the motors would distribute the fault and disable the locomotive, even if the traction motor is cut out with contactors.

However, since the resistors are not required during motoring, a faulting resistor condition can be isolated during motoring by isolating the resistors from the traction motor to thereby avoid disabling the locomotive. Only the dynamic braking and self-load functions are degraded for the isolated resistor. During normal operating conditions, with no faults on the resistors, the brake motor isolation switch and the existing braking switch will switch the resistors across the traction motors for dynamic braking or self-load.

Thus, at least the following advantageous improvements and features to traction motors are provided by embodiments of the present disclosure:

Electrical isolation in the event of a ground or other electrical fault is achieved, thereby leaving all of the remaining traction motors of the locomotive (typically three to five motors) available for use. This feature is in contrast to the prior art wherein each traction motor was hard wired in parallel with typically three to five other motors. Thus, a fault in one motor would render all of the parallel motors inoperable. By providing electrical isolation between motors, the remaining (i.e., operable) motors are available to allow the locomotive to complete its mission and return home for service.

The ground-fault detector is wired so that it can monitor a ground-fault in any of the multiple (e.g., four or six) traction motors, but remain operable even if a fault occurs. The novel brake motor isolation switch enables this feature. This feature is in contrast to the prior art wherein the ground-fault detector was hard wired to a plurality of motors so that if a fault occurred to any motor, the fault would render the detector inoperable for all of the motors.

Time-delay switching of a pair of isolating switches is provided for isolating the traction motor. The first isolating switch may be opened while under electrical load (e.g., 1200 amps), so this switch is physically isolated against the resultant arcing, which isolation is costly and requires a lot of space on a locomotive. However, because of the time-delay, the second isolating switch can be opened while electrically unloaded, and thus may be a much smaller and less expensive switch. This feature is in contrast to the prior art wherein the operation of these two switches was not effected by means of the time-delay opening of these switches, and therefore required two large and expensive switches.

The motors are also associated with a novel mechanical and electrical arcing shield for the isolating switch. In the prior art, a switch opening against a load was housed in a special cab which required significant open space, so that any arcing would not reach the metal enclosure defining the cab. In an embodiment of the present disclosure, a closely spaced substantially non-conductive housing (such as glass) is provided to contain any arcing. This shielded switch is a significant improvement over the prior art, as it requires far less space in the locomotive.

While exemplary embodiments have been shown and described, various modifications and substitutions may be made thereto by those of ordinary skill in the pertinent art, both now and in the future, without departing from the true scope and spirit of this disclosure. Accordingly, it is to be understood that the present disclosure has been made by way of illustration only, and such illustrations and embodiments as have been disclosed herein are not to be construed as limiting to the claims.

What is claimed is:

1. A railroad locomotive comprising;
   a plurality of traction motors, with the motors being connected in parallel circuit and driving a plurality of traction wheels of the locomotive; and
   at least one isolation switch disposed in electrical communication with at least one of the plurality of traction motors, but less than all of the traction motors, the isolation switch operating upon a fault in the circuit exposing said isolation switch to ground to electrically isolate the faulting circuit, while leaving other portions of the circuit and other respective traction motors operative.

2. A railroad locomotive as defined in claim 1, further comprising:
   at least one electrical fault detector disposed in communication with at least one of the plurality of traction motors.

3. A railroad locomotive as defined in claim 2 wherein:
   the at least one electrical fault detector comprises a ground-fault detector disposed in signal communication with at least one of the plurality of traction motors.

4. A railroad locomotive as defined in claim 1 wherein:
   the at least one isolation switch comprises a brake motor isolation switch.

5. A railroad locomotive as defined in claim 1, further comprising:
   at least one arcing shield disposed about the at least one isolation switch.

6. A railroad locomotive as defined in claim 5 wherein:
   the at least one arcing shield comprises a non-conductive housing.

7. A railroad locomotive as defined in claim 6 wherein:
   the non-conductive housing of the at least one arcing shield comprises glass.

8. A brake motor isolation switch for electrically isolating at least one traction motor of a railroad locomotive upon a circuit fault exposing the motor to ground comprising:
   a first isolation switch having anti-arcing insulation for breaking an electrically loaded connection; and
   a second isolation switch of lower power switching capacity than the first switch for breaking an electrically unloaded connection, disposed in series communication with the first isolation switch and opening after the first isolation switch opens.

9. A brake motor isolation switch as defined in claim 8, further comprising a non-conductive anti-arcing shield disposed in proximity with the first isolation switch.

10. A method of controlling at least one of a plurality of electrical elements connected in a parallel circuit subject to faulting to ground in a locomotive, the method comprising:
    detecting an electrical fault in the circuit including at least one of the plurality of electrical elements;
    isolating the one of the plurality of electrical elements having the detected fault from the others of the plurality of electrical elements; and
    powering the others of the plurality of electrical elements to propel the locomotive.

11. A method as defined in claim 10 wherein:
    at least one of the plurality of electrical elements comprises a traction motor.

12. A method as defined in claim 10 wherein:
    at least one of the plurality of electrical elements comprises a resistor.

13. A method as defined in claim 10 wherein:
    the detected electrical fault comprises a ground-fault.

14. A method as defined in claim 10 wherein:
    isolating comprises time-delay switching a pair of isolation switches to isolate the one of the plurality of electrical elements.

15. A method as defined in claim 14 wherein:
    the first of the pair of isolation switches is opened while electrically loaded, and the second of the pair of isolation switches is opened after the first, while electrically unloaded.

16. A method as defined in claim 10 wherein:
    powering comprises electrically powering at least two of the plurality of electrical elements in electrical parallel combination with each other.

17. A railroad locomotive comprising:
    a plurality of traction motors, wherein said traction motors are connected in a parallel circuit so as to drive a plurality of traction wheels of the locomotive;
    at least one electrical fault detector disposed so as to be communicated with at least one of said plurality of traction motors so as to detect a ground fault in any of said plurality of tractions motors and remain operable thereafter; and at least one isolation switch disposed in electrical communication with at least one of said plurality of traction motors, but less than all of said plurality of traction motors, said isolation switch operating upon a fault in a circuit exposing it to ground to electrically isolate said circuit, while leaving other portions of said circuit and other respective traction motors operative.

18. A railroad locomotive according to claim 17, wherein at least one of said isolation switch is responsive to said electrical fault detector.

19. A railroad locomotive according to claim 18, wherein at least one of said electrical fault detector is disposed so as to detect a ground fault recovery in any of said plurality of tractions motors and remain operable thereafter.

* * * * *

UNITED STATES PATENT AND TRADEMARK OFFICE
CERTIFICATE OF CORRECTION

PATENT NO. : 6,497,182 B2
DATED : December 24, 2002
INVENTOR(S) : Donald J. Melpolder et al.

It is certified that error appears in the above-identified patent and that said Letters Patent is hereby corrected as shown below:

Column 2,
Line 6, before "26" delete "ajunction" and insert -- a junction --; and
Line 12, before "34" (first occurrence) delete "ajunction" and insert -- a junction --.

Column 3,
Line 1, after "circuit" delete "1" and insert -- 10 --; and
Line 44, after "to" delete "ajunction" and insert -- a junction --.

Signed and Sealed this

Tenth Day of January, 2006

JON W. DUDAS
*Director of the United States Patent and Trademark Office*